No. 649,616. Patented May 15, 1900.
C. PRICKETT.
WRENCH.
(Application filed Feb. 21, 1900.)
(No Model.)
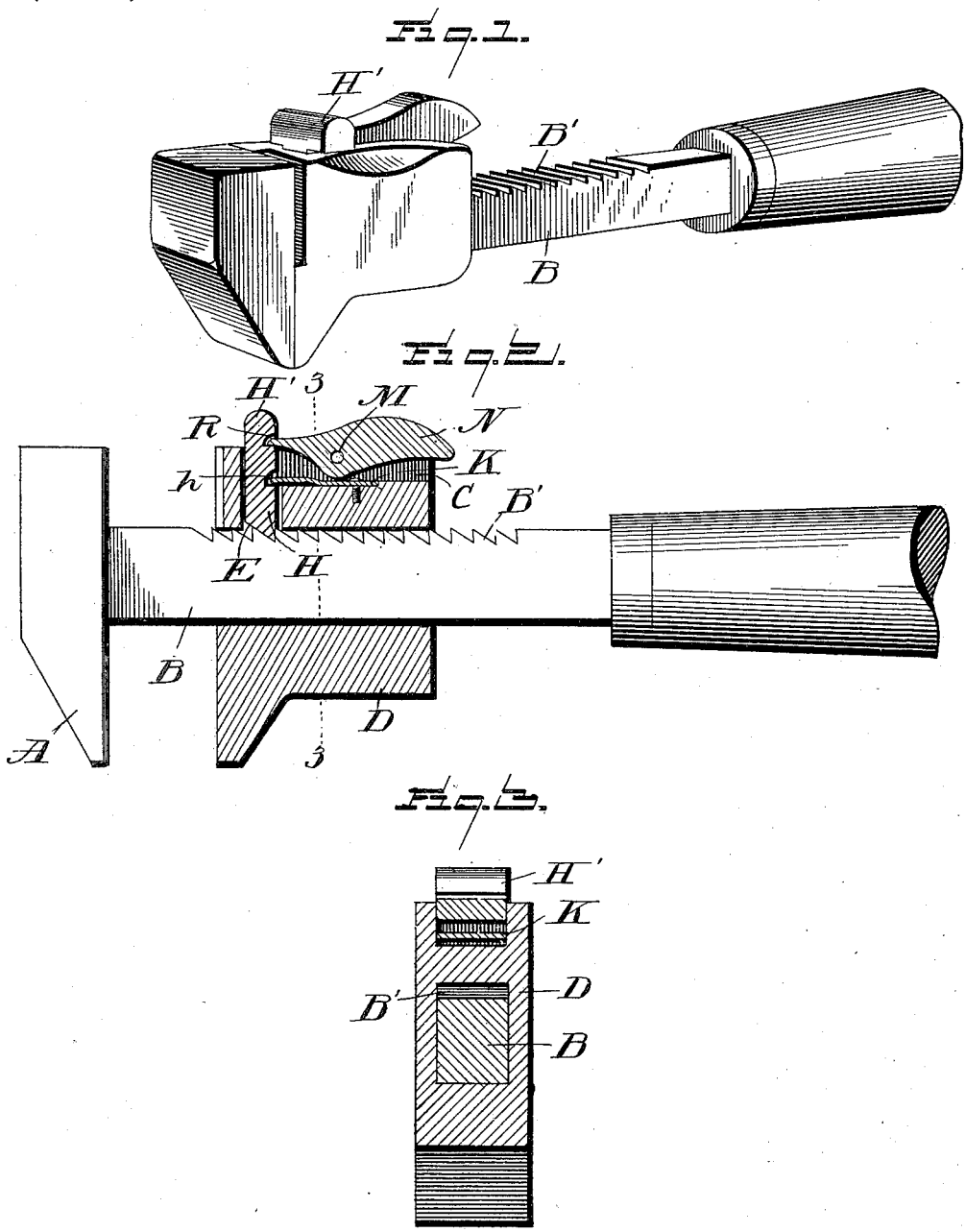
WITNESSES:
L. C. Hills,
A. L. Hough.
INVENTOR
Clinton Prickett,
By Franklin N. Hough
Attorney

UNITED STATES PATENT OFFICE.

CLINTON PRICKETT, OF CATAWBA, WEST VIRGINIA.

WRENCH.

SPECIFICATION forming part of Letters Patent No. 649,616, dated May 15, 1900.

Application filed February 21, 1900. Serial No. 6,060. (No model.)

*To all whom it may concern:*

Be it known that I, CLINTON PRICKETT, a citizen of the United States, residing at Catawba, in the county of Marion and State of West Virginia, have invented certain new and useful Improvements in Wrenches; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in wrenches, and especially to a sliding-jaw ratchet-wrench in which a series of teeth are provided upon the rear face of the stationary shank portion of the wrench, said teeth adapted to be engaged by a spring-actuated dog mounted in the sliding jaw and held at right angles to the teeth, a pivoted and spring-actuated button being provided, which is adapted to engage said dog for the purpose of raising and disengaging the lower end of the dog from the teeth of the shank portion of the stationary jaw.

To these ends and to such others as the invention may pertain the same consists, further, in the novel construction, combination, and adaptation of parts, as will be hereinafter more fully described and then specifically defined in the appended claim.

My invention is clearly illustrated in the accompanying drawings, which, with the letters of reference marked thereon, form a part of this application, and in which—

Figure 1 is a perspective view of my improved wrench. Fig. 2 is a central vertical longitudinal sectional view through the wrench. Fig. 3 is a cross-sectional view through the wrench on line 3 3 of Fig. 2.

Reference now being had to the details of the drawings by letter, A designates the stationary jaw, having a shank portion B, with a series of teeth on its rear face, as shown at B'. The sliding jaw D is longitudinally apertured to receive the shank portion of the stationary jaw and is also recessed upon its upper face, as shown at C. Leading from the bottom of said recess is a hole E, at right angles to the longitudinal aperture in said sliding jaw. Working longitudinally in said hole E is a dog H, beveled on its teeth-engaging end and having a headed portion H'. Secured to the bottom of said recessed portion is a spring K, the free end of which engages in a recess $h$ in one face of said dog, whereby said dog will be normally held in engagement with the teeth of the shank portion of the stationary jaw. Mounted in the opposite vertical walls of said recessed portion is a pin M, on which a button N is pivoted, one end of which button extends into a recess R in the dog H, while the opposite end of said button extends slightly above the upper edge of the sliding jaw.

In operation when it is desired to allow the sliding jaw to change its position the operator depresses the outer end of said button, and by reason of the opposite end of the button engaging in the recess in the dog the latter will be raised as the button tilts on its pivot. As the dog rises the spring engaging said dog will be under tension and the sliding jaw may be moved back and forth on the shank portion of the stationary jaw. As pressure is relieved from the end of the button the spring will throw the dog down to an engaging relation with the teeth, as will be readily understood. The flanges on the dog, forming its head, before referred to, will strike against the upper edges of the walls of the recessed portion of the sliding wrench, thus limiting its downward throw.

Having thus described my invention, what I claim to be new, and desire to secure by Letters Patent, is—

A sliding-jaw nut-wrench, comprising a stationary jaw with integral shank portion, having teeth upon one of its faces, a sliding jaw mounted on said shank portion, a vertically-sliding dog having a head normally resting on the outer recessed face of said sliding jaw, and its lower end held in engagement with said teeth, a spring secured at one end to the bottom of the recess in the sliding jaw and its free end seated in a recess in the face of said dog, and the pivoted button having one end resting in a second recess in the face of the dog, as set forth.

In testimony whereof I affix my signature in presence of two witnesses.

CLINTON PRICKETT.

Witnesses:
H. B. MORGAN,
L. S. MORGAN.